Oct. 31, 1933.  B. F. TEETOR  1,933,354
STRESS MEASURING MEANS
Filed Oct. 3, 1930  2 Sheets-Sheet 1
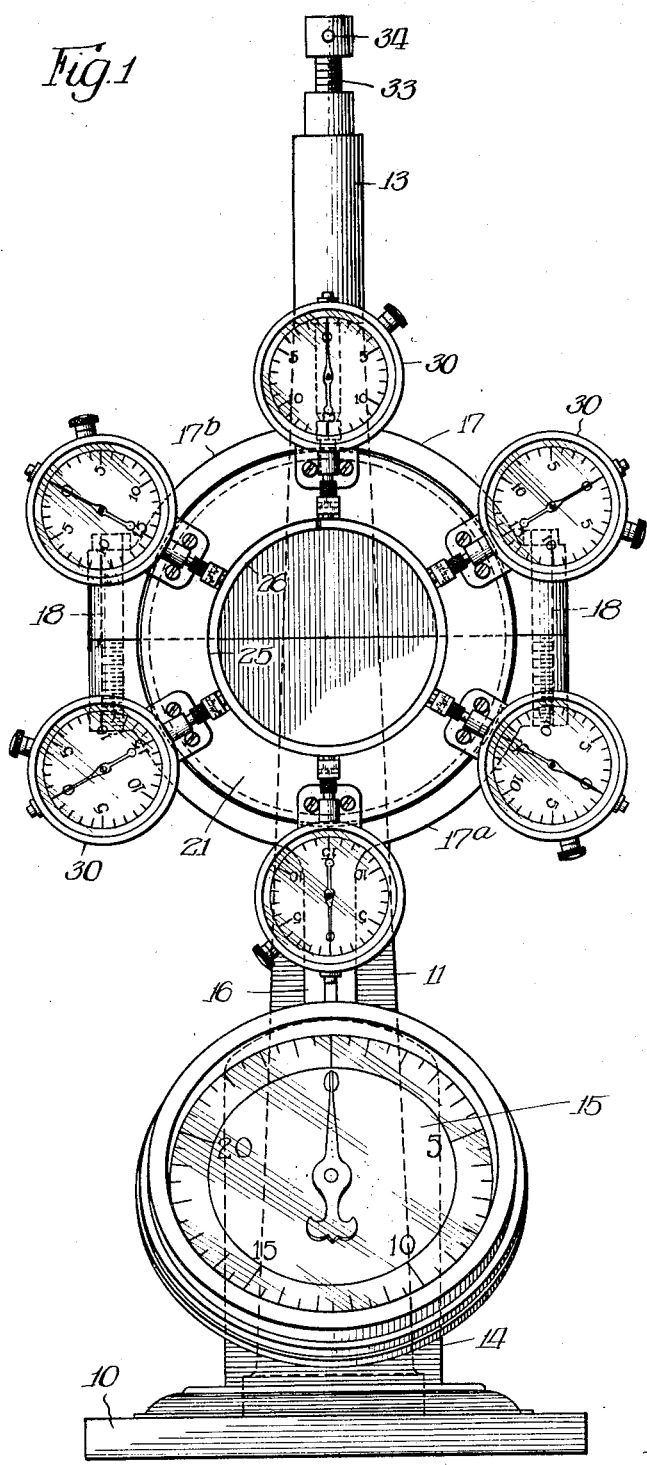
Inventor:
Benjamin F. Teetor.

Oct. 31, 1933.   B. F. TEETOR   1,933,354
STRESS MEASURING MEANS
Filed Oct. 3, 1930   2 Sheets-Sheet 2

Inventor:
Benjamin F. Teetor

Patented Oct. 31, 1933

1,933,354

UNITED STATES PATENT OFFICE 1,933,354

STRESS MEASURING MEANS

Benjamin F. Teetor, Hagerstown, Ind.

Application October 3, 1930. Serial No. 486,065

6 Claims. (Cl. 73—51)

The present invention relates to measuring means.

More particularly the present invention relates to means for measuring the relative stresses set up about the periphery of an annular member such as a piston ring. An ideal piston ring would have uniform pressure against the cylinder wall throughout its periphery, and much research has been done toward the design of piston rings to approach such an ideal. Various claims are made by manufacturers that their piston rings approach such an ideal more or less closely, but up to the present time, insofar as applicant is informed, no convenient means has been available to test piston rings in this connection.

An object of the present invention is to provide a simple and easily operable means for testing the stresses set up around the periphery of a piston ring.

A further object is to provide a device which may be manufactured at relatively low cost for readily indicating the pressures necessary to cause any predetermined deflection in a piston ring throughout the periphery thereof.

A further object is to provide a measuring means which will readily indicate the relation between deflection and the force causing such deflection at various regions around the periphery of a piston ring or the like.

Further objects will appear as the description proceeds.

Referring to the drawings—

Figure 1 is a view in front elevation of one embodiment of the present invention;

Figure 3:
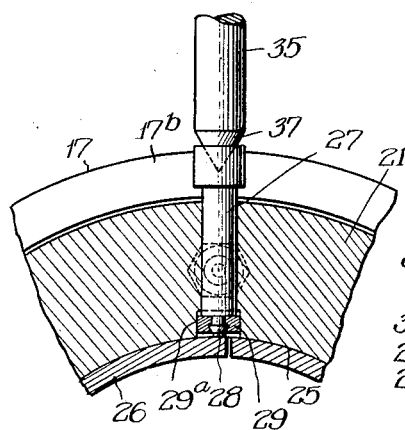
Figure 3 is a view on an enlarged scale of a detail of construction.
Figure 2:
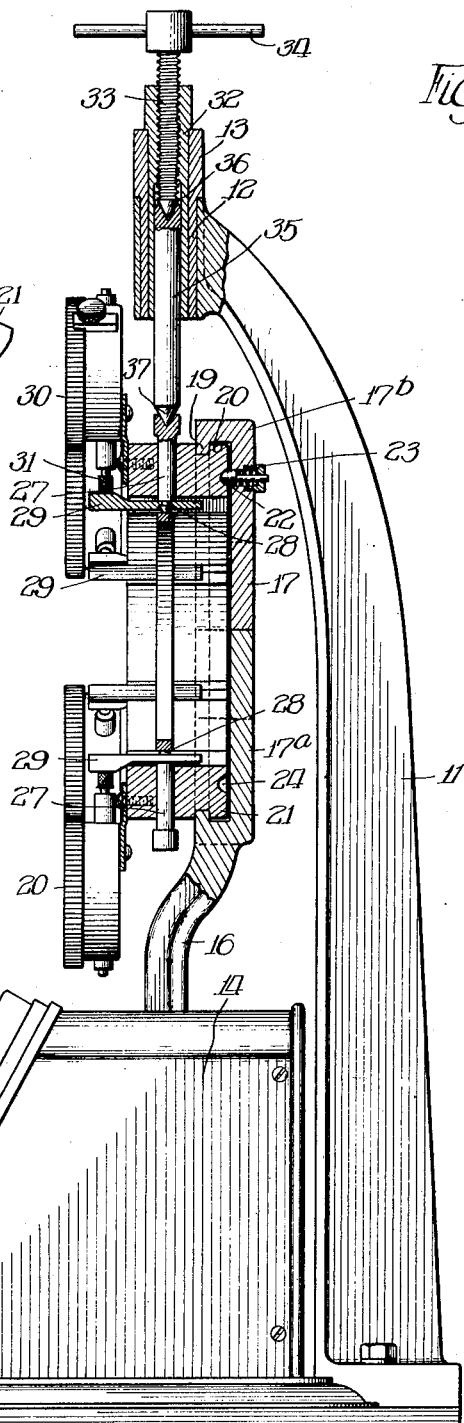
Figure 2 is a view in side elevation partly in section of the same structure.

The particular embodiment of the present invention chosen for illustration is not to be considered in a limiting sense, but as one which has been made up out of parts readily purchasable in the open market.

The numeral 10 indicates a base having a standard 11 upstanding therefrom, which standard is provided at the upper extremity thereof with a cylindrical bore, indicated by the numeral 12, for the reception of a bushing 13. The base 10 provides a foundation for a scale 14, the face 15 of which may be inclined to the vertical, whereby to be readily visible to an observer. The scale 14 is provided with the upstanding stem 16 provided with the housing 17, which housing 17 provides a mounting means for certain mechanism for holding a ring to be tested and certain indicating mechanism to be referred to presently. It may be stated at this point that the longitudinal axis of the stem 16 should preferably be in alignment with the bore of the bushing 13. Moreover, the center of mass of the housing 17 and the parts carried thereby should preferably be substantially in the line above referred to.

The housing 17 is illustrated as being in two parts, indicated by the numerals 17a and 17b, said parts being held together by means of machine screws 18—18. Said housing 17 is provided with an annular lip 19 providing an annular channel 20 for the reception of the rotatable member 21. The housing 17 is provided with the spring-pressed plunger 22, which is urged by the spring 23 in a forward direction. Said plunger 22 has its forward extremity rounded and is adapted to seat into any one of a plurality of recesses 24 disposed, preferably at equal intervals, in the rear wall of the rotatable member 21. It will be clear that the rotatable member 21 will be held by means of the spring-pressed plunger 22 releasably in any one of a plurality of positions.

The rotatable member 21 is illustrated as being an annulus having a smooth circular inner wall 25 for the reception of a piston ring or other annular member 26, said inner wall 25 having the diameter of the cylinder in which the ring 26 is designed to operate.

The rotatable member 21 is provided with a plurality of plungers 27—27 corresponding in number to the recesses 24—24. Said plungers 27—27 are radially disposed in the rotatable member 21 and are adapted to be brought in alignment with the bore of the axis of the bushing 13. Each of the plungers 27 is provided with an abutment 28 adapted to contact with the outer periphery of the ring 26. Each abutment 28 is riveted or otherwise secured to a corresponding outstanding member 29 adapted to have a sliding movement in a radial direction within a corresponding slot 29a disposed in the inner periphery of the annular rotatable member 21.

Disposed upon the forward face of the rotatable member 21 are a plurality of deflection indicators, indicated by the numerals 30—30. Deflection indicators suitable for the purpose are readily purchasable in the open market. Each of said deflection indicators may be adjustable, whereby a zero or other predetermined reading may be readily indicated. Each of said indicators is provided with a stem 31 adapted to contact with one of the outstanding members 29—29. Movement of the corresponding outstanding member 29 will be indicated on the corresponding deflection indicator. Such movement will be accomplished by means which will now be described.

Disposed within and coaxially with the bushing 13 is the internally screw-threaded bushing 32, which carries the screw 33 having the operating handle 34. Said screw 33 communicates with the upper extremity of the stress-communicating stem 35, the lower extremity of which is adapted to contact selectably with the outer extremities of the plungers 27. As illustrated, the lower extremity of the screw-threaded stem 33 is cone-shaped, as indicated by the numeral 36, and seats itself within a corresponding socket in the stem 35. The lower extremity of the stem 35 is provided with the cone-shaped extremity 37 adapted to seat itself within a corresponding socket in any of the plungers 27.

The mode of operation of the above described embodiment of the present invention will be clear without detailed explanation. A ring 26 to be tested will be placed within the annular rotatable member 21, the operator doing this manually if preferred. The ring 26 is split, according to usual practice, and one extremity of said ring will be located in engagement with the abutment 28 corresponding to the plunger 27 which happens to be in alignment with the stress-communicating stem 35. Said ring 26 will be symmetrically disposed within the annular member 21, whereby said ring is adapted to be contacted selectably by the abutments 28 of the various plungers 27.

The indicating portion of the scale 14 may be so calibrated that the weight carried by said scale, including the bracket 17, the rotatable member 21 and the parts carried by said rotatable member including the member to be tested, will give a zero reading upon said scale 14 when no pressure is being exerted upon the ring 26 through the stress-communicating stem 35.

The screw-threaded stem will then be turned down, whereby force will be communicated through the stem 35 to the plunger 27 and ring 26. The deflection of the ring 26 under such action will be indicated by the corresponding deflection indicator 31. The extra force applied to the scale 14 by this action will be noted by the observer. The screw 33 will then be backed off and the rotatable member 21 turned until the spring-pressed plunger 22 seats itself within the next recess 24, thereby accurately predetermining a fractional turn of the rotatable member 21, or, what is the same thing, a fractional turn of the ring 26. Corresponding readings may be taken at a plurality of points around the ring, which number of points in the illustrated embodiment of the present invention is six. It will be clear that the number of stations of the rotatable member 21 may be chosen as desired, the number of plungers 27 and the corresponding deflection indicators being correspondingly chosen. In case it is desired to provide a cheaper construction, satisfactory results may be obtained by providing only one plunger 27 and having the annular member 21 non-rotatable. In such case it will be necessary to move the ring 26 circumferentially within the annular member 21 to locate selected portions of said ring in position to be engaged by the lower extremity of the plunger 27.

Though one practical embodiment of the present invention has been described in detail, many modifications will occur to those skilled in the art. It is intended to cover all such modifications that fall within the scope of the appended claims.

What is claimed is—

1. In an indicating mechanism, in combination, a rigid member having a weighing scale fixed relative thereto, a rotatable ring carrying member carried by said scale, means having abutting relationship with said rigid member for communicating a deflecting force to the periphery of said ring in a direction to add to the effective weight of said ring carrying means, and deflection indicating means carried by said ring carrying means for measuring the deflection of said ring.

2. In measuring mechanism, in combination, a relatively rigid member, a weight indicating scale fixed relative thereto, a rotatable ring carrying member carried by said scale, said rigid member having means for applying force to a ring within said ring carrying member along substantially the line of force applied to said scale by the weight of said ring carrying member, and deflection indicating means for indicating the deflection of said ring.

3. In measuring means, in combination, a relatively rigid member, a weight indicating scale fixed relative thereto, a rotatable ring carrying member carried by said scale, a plunger extending through said ring carrying member in a direction toward the axis of rotation of said rotatable ring carrying member and substantially along the line of force communicated to said scale by said ring carrying member and adapted to contact with the periphery of a ring within said ring carrying member, means carried by said relatively rigid member for communicating force to said plunger axially thereof, and means for indicating movement of said plunger.

4. In measuring means, in combination, a rotatable ring carrying means, scale means for supporting said ring carrying means and a ring carried by said carrying means, means adapted to apply a deflecting force to the periphery of said ring disposed within said ring carrying means along substantially the line of force applied to said scale means by means of said ring carrying means, and means for measuring the amount of deflection due to the application of said deflecting force.

5. In measuring means, in combination, rotatable ring carrying means, scale means for supporting said ring carrying means and a ring carried thereby, said ring carrying means including an annular member adapted to receive said ring, means for communicating a deflecting force to the periphery of said ring substantially along the line of force communicated to said scale means by said ring carrying means, and indicating means carried by said ring carrying means for measuring the deflection of said ring.

6. In measuring means, in combination, a relatively rigid member, a weight indicating scale fixed relative thereto, a rotatable ring carrying member supported by said scale, a plurality of plungers extending through said ring carrying member in radial directions and adapted to contact with the periphery of a ring within said ring carrying member, means carried by said relatively rigid member for communicating force selectably to said plungers axially thereof and substantially along the line of force communicated to said scale by said ring carrying member, and means for indicating movements of said plungers.

BENJAMIN F. TEETOR